(12) United States Patent
Poojary et al.

(10) Patent No.: US 12,307,911 B2
(45) Date of Patent: *May 20, 2025

(54) MULTI-SENSOR DATA FUSION-BASED AIRCRAFT DETECTION, TRACKING, AND DOCKING

(71) Applicant: Honeywell International Inc., Charlotte, NC (US)

(72) Inventors: Rajesh V. Poojary, Bangalore (IN); Raghu Seelamonthula, Bangalore (IN); Vinay Sridhara Murthy, Bangalore (IN); Manuj Sharma, Bangalore (IN)

(73) Assignee: Honeywell International Inc., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/244,361

(22) Filed: Sep. 11, 2023

(65) Prior Publication Data
US 2024/0046807 A1 Feb. 8, 2024

Related U.S. Application Data

(63) Continuation of application No. 18/088,937, filed on Dec. 27, 2022, now Pat. No. 11,756,440, which is a
(Continued)

(51) Int. Cl.
*G08G 5/06* (2006.01)
*B64D 45/00* (2006.01)
(Continued)

(52) U.S. Cl.
CPC ............... *G08G 5/51* (2025.01); *B64D 45/00* (2013.01); *G05D 1/0202* (2013.01);
(Continued)

(58) Field of Classification Search
CPC ...... G08G 5/065; G08G 5/0026; B64D 45/00; G05D 1/0202; G06F 18/251; G06T 7/521;
(Continued)

(56) References Cited

U.S. PATENT DOCUMENTS

| 5,675,661 | A | 10/1997 | Richman |
| 10,255,520 | B2 | 4/2019 | Deng et al. |

(Continued)

FOREIGN PATENT DOCUMENTS

| CN | 108932875 A | 12/2018 |
| CN | 111427374 A | 7/2020 |

(Continued)

OTHER PUBLICATIONS

Chinrungrueng J, "Smart Parking: An Application of Optical Wireless Sensor Network," International Symposium on Applications and the Internet Workshops, Jan. 15, 2007, 5 pgs.
(Continued)

*Primary Examiner* — Yuen Wong
(74) *Attorney, Agent, or Firm* — Brooks, Cameron & Huebsch, PLLC

(57) ABSTRACT

Tracking aircraft in and near a ramp area is described herein. One system for tracking an aircraft, comprising: a sensor array, positioned at or near a ramp area at an airport, having a camera image sensor device and a light detection and ranging (LIDAR) sensor device that are both located at a single sensor array location with respect to the ramp area; the camera image sensor device configured to capture camera image data illustrating the aircraft while the aircraft is approaching or in the ramp area; the LIDAR sensor device configured to capture LIDAR sensor device data illustrating the aircraft while the aircraft is approaching or in the ramp area.

11 Claims, 7 Drawing Sheets

Related U.S. Application Data continuation of application No. 16/983,657, filed on Aug. 3, 2020, now Pat. No. 11,538,349.

(51) Int. Cl.

| | |
|---|---|
| G05D 1/00 | (2006.01) |
| G06F 18/25 | (2023.01) |
| G06T 7/521 | (2017.01) |
| G06V 20/13 | (2022.01) |
| G08G 5/51 | (2025.01) |

(52) U.S. Cl.
CPC ............ *G06F 18/251* (2023.01); *G06T 7/521* (2017.01); *G06V 20/13* (2022.01)

(58) Field of Classification Search
CPC .................. G06V 20/13; G01S 13/874; G01S 2013/9323; G01S 7/412; G01S 13/04; G01S 13/08; G01S 13/867; G01S 13/934; G01S 7/417; G01S 13/58; G01S 7/4802; G01S 17/58; G01S 17/66; G01S 17/86; G01S 17/933; G01S 17/42; B64F 1/002
See application file for complete search history.

(56) References Cited

U.S. PATENT DOCUMENTS

| | | | |
|---|---|---|---|
| 10,354,805 | B2 | 7/2019 | Hemphill |
| 10,989,791 | B2 | 4/2021 | Tuxen |
| 11,538,349 | B2 | 12/2022 | Poojary |
| 2013/0062459 | A1 | 3/2013 | Cox |
| 2013/0176425 | A1 | 7/2013 | Lener |
| 2015/0021431 | A1 | 1/2015 | Kracht |
| 2017/0178520 | A1* | 6/2017 | Papageorgiou .......... G08G 5/04 |
| 2017/0226764 | A1 | 8/2017 | Nussbaum |
| 2019/0310373 | A1 | 10/2019 | Rutkiewicz |
| 2020/0064483 | A1 | 2/2020 | Li |
| 2020/0180783 | A1 | 6/2020 | Cox et al. |
| 2022/0066025 | A1 | 3/2022 | Berkmo |

FOREIGN PATENT DOCUMENTS

| | | |
|---|---|---|
| DE | 102014112269 | 8/2014 |
| EP | 3680689 | 7/2020 |
| EP | 3680689 A1 | 7/2020 |
| JP | 2001187599 A | 7/2001 |
| JP | 4071412 | 4/2008 |
| KR | 101314566 B1 | 10/2013 |
| WO | 2015005534 A1 | 1/2015 |
| WO | 2017162432 | 9/2017 |

OTHER PUBLICATIONS

Tran, V.L., "A Study on Ship Automatic Berthing with Assistance of Auxiliary Devices," International Journal of Naval Architecture and Ocean Engineering, 2012, 13 pgs.

Mi, C., "Ship Identification Algorithm based on 3D Point Cloud for Automated Ship Loaders." Journal of Coastal Research, (73), 2015, 9 pgs.

Thupakula, K., "Data Fusion Techniques for Object Identification in Airport Environment." SAE Technical Paper 2017-01-2109, Sep. 19, 2017, 6 pgs.

Miller, I., "Team Cornell's Skynet: Robust Perception and Planning in an Urban Environment," Journal of Field Robotics, 25(8), 2008, 36 pgs.

Schumann, O., "Semantic Segmentation on Radar Point Clouds," International Conference on Information Fusion (FUSION), Jul. 2018, 9 pgs.

Aldoma, A., "Tutorial: Point Cloud Library: Three-Dimensional Object Recognition and 6 DoF Pose Estimation," IEEE Robotics & Automation Magazine 19, No. 3, 2012, 13 pgs.

I. Miller, "Sensitivity Analysis of a Tightly-Coupled GPS/INS System for Autonomous Navigation," IEEE Transactions on Aerospace and Electronic Systems, 48(2), 2012, 22 pgs.

Mund, J., "Introducing Lidar Point Cloud-based Object Classification for Safer Apron Operations," International Symposium on Enhanced Solutions for Aircraft and Vehicle Surveillance Applications, Apr. 2016, 11 pgs.

I. Miller, "Efficient Unbiased Tracking of Multiple Dy-namic Obstacles Under Large Viewpoint Changes," IEEE Transactions on Robotics, 27(1), Feb. 2011, 19 pgs.

F. Havlak, "Discrete and Continuous, Probabilistic Anticipation for Autonomous Robots in Urban Environments," IEEE Transactions on Robotics, 30(2), Apr. 2014, 15 pgs.

I. Miller, "Map-aided Localization in Sparse Global Positioning System Environments using Vision and Particle Filtering," Journal of Field Robotics, 28(5), Sep. 2011, 26 pgs.

Campbell, M. E., "Distributed Data Fusion: Neighbors, Rumors, and the Art of Collective Knowledge," IEEE Control Systems, 36(4), Aug. 2016, 28 pgs.

Deng, J., "Imagenet: A large-scale Hierarchical Image Database," IEEEConference on Computer Vision and Pattern Recognition, Jun. 2009, 9 pgs.

Rusu, R.B., "3D is Here: Point Cloud Library (PCL)" IEEE International Conference on Robotics and Automation (ICRA), 2011, 5 pgs.

Ip, C.Y., "Retrieving Matching CAD Models by using Partial 3D Point Clouds," Computer-Aided Design and Applications, 4(5), 2007, 11 pgs.

Wohlkinger, W., "3Dnet: Large-scale Object Class Recognition from CAD Models," IEEE International Conference on Robotics and Automation, May 2012, 9 phs.

Vock, R., "Fast Template Matching and Pose Estimation in 3D Point Clouds," Computers & Graphics, 79, 2019, 11 pgs.

Qi, C.R., "Pointnet: Deep Learning on Point Sets for 3D Classification and Segmentation," IEEE Conference on Computer Vision and Pattern Recognition, 2017, 20 pgs.

Wang, Y., "Pseudo-Lidar from Visual Depth Estimation: Bridging the Gap in 3D Object Detection for Autonomous Driving," IEEE/CVF Conference on Computer Vision and Pattern Recognition, 2019, 10pgs.

Bar-Shalom, "Y. Estimation with applications to tracking and navigation: theory algorithms and software." John Wiley & Sons, 2001, 100 pgs.

Petrovskaya, A. "Model based vehicle detection and tracking for autonomous urban driving." Autonomous Robots, 26 (2-3), 2009, pp. 123-139.

Campbell, M. "Expert Declaration", retrieved Oct. 2023, 101 pgs.

Berkmo, A. "Annoted version of Berkmo highlighting paragraphs included in Berkmo but absent from EP'689" Mar. 2022, 23 pgs.

Weinstein, M. "Post Grant Review" retrieved Oct. 2023, 92 pgs.

Renuka, et al. "Smart Ramp Information Display System", International Journal of Pure and Applied Mathematics, vol. 119, No. 16, 2018, 6 pages.

Rodriguez-Garavito, et al., "Automatic Laser And Camera Extrinsic Calibration for Data Fusion Using Road Plane", IEEE Intelligent Transportation Systems Conference, 2006, 6 pages.

Extended European Search Report for related EP Application No. 21189230.2, mailed Dec. 17, 2021 (11 pgs).

*ADB Safegate Sweden AB et al. v. Honeywell International Inc.*, decision of the Patent Trial and Appeal Board, U.S. Pat. No. 11,538,349 B2, paper No. 24, 72 pages.

\* cited by examiner

RECEIVING CAMERA IMAGE DATA OF AN AIRCRAFT WHILE THE AIRCRAFT IS APPROACHING OR IN THE RAMP AREA;
790

RECEIVING LIDAR OR RADAR SENSOR DATA OF AN AIRCRAFT WHILE THE AIRCRAFT IS APPROACHING OR IN THE RAMP AREA;
792

MERGING THE CAMERA IMAGE DATA AND THE LIDAR OR RADAR SENSOR DATA INTO A MERGED DATA SET; AND
794

WHEREIN THE MERGED DATA SET INCLUDES AT LEAST ONE OF: DATA FOR DETERMINING THE POSITION AND ORIENTATION OF THE AIRCRAFT RELATIVE TO THE POSITION AND ORIENTATION OF THE RAMP AREA, DATA FOR DETERMINING SPEED OF THE AIRCRAFT, DATA FOR DETERMINING DIRECTION OF THE AIRCRAFT, DATA FOR DETERMINING PROXIMITY OF THE AIRCRAFT TO A PARTICULAR OBJECT WITHIN THE RAMP AREA, AND DATA FOR FORMING A THREE DIMENSIONAL VIRTUAL MODEL OF AT LEAST A PORTION OF THE AIRCRAFT FROM THE MERGED DATA.
796

FIG. 7

MULTI-SENSOR DATA FUSION-BASED AIRCRAFT DETECTION, TRACKING, AND DOCKING

PRIORITY INFORMATION

This application is a continuation of U.S. application Ser. No. 18/088,937, filed Dec. 27, 2022, and issued as U.S. Pat. No. 11,756,440, on Sep. 12, 2023, which is a continuation of U.S. application Ser. No. 16/983,657, filed Aug. 3, 2020, and issued as U.S. Pat. No. 11,538,349, the contents of which are incorporated by reference.

TECHNICAL FIELD

The present disclosure relates to detection, tracking, and docking aircraft in a taxiway, apron, or ramp area of an airport.

BACKGROUND

Airport gates on the airside of an airport are characterized as parking spaces that are designed to enable the parking of aircraft of different dimensions (e.g., based on wingspan, fuselage length) and, in many situations, access to a ramp to allow for the ingress and egress of passengers and crew to the aircraft. These spaces, called ramp areas or parking stands, are size-constrained, particularly when there are fixed obstacles (e.g., stand furniture) in close proximity to an aircraft when it is being parked. Hazards associated with aircraft maneuvering and parking, therefore, make the accuracy of aircraft position on-stand more critical.

Aircraft pilots (self-powered) or tug drivers (aircraft is being towed) pull aircraft into gates with visual guidance provided by a marshal and wing-watchers to safely park the aircraft in a gate area (e.g., where the area is in contact with the gate or remote therefrom). A marshal aligns the nose wheel with a guidance line and designates when to stop the aircraft at the designated stop position. Wing-watchers stop movement of any ground vehicles in proximity to the aircraft and ensure clearance of wingtips from any obstacles.

Manual approaches to these repetitive tasks have long been error prone and consistency in visual guidance to pilots from different parts of the world has been problematic. Accordingly, there has been movement toward using automated systems for some of these tasks or to assist in the guidance of the aircraft have seen the need for an automated system. Such systems are generally referred to as—Docking Guidance Systems (DGS).

Early approaches to DGS leveraged mirrors but posed significant limitations and distracted the pilot. Subsequent approaches to DGS leveraged intrusive technologies like induction loops, again with significant limitations.

Regulatory requirements too evolved and as technologies became more capable, DGS system evolved from being Visual Docking Guidance Systems (VDGS) to Advanced Visual Docking Guidance Systems (A-VDGS). This included for providing active azimuth guidance with deviation calculated by the system. Further various aircraft models (types/sub-types) got introduced to meet the demand for air travel and airports equally adopted more complicated gate designs, like Multiple Aircraft Ramp Stands (MARS).

Today, airports also use systems that relay information to the pilots for managing aircraft movement in areas further away from the ramp area and use lasers to track an aircraft's movement on the ground. However, conventional laser/LIDAR systems have issues with: a curved approach of an aircraft to a ramp area, long range detection of the aircraft as it approaches, dark colored aircraft detection, and thick snow/foggy/heavy rain conditions or conditions with precipitation. Also, they do not generate images for use by the system, so there are no image archives for incident analysis, among other issues.

Other airports use camera systems that relay information to the pilots for managing aircraft movement in areas close to the ramp area and use cameras to track the aircraft's movement. Camera systems airports currently use may have issues with accuracy of docking due to accuracy of distance measurements, and they have precise calibration requirements which can make the system difficult to set up and be relied upon for accurate measurements. Camera systems also may not require frequent calibrations and monitoring of the systems, and can have no redundancy if the camera system malfunctions or cameras are obscured for some reason, among other potential issues.

Because of the above issues, airports using these systems face failed dockings where the aircraft is too far forward or back from the ramp, not parallel with or aligned with the lead-in line or not positioned on the lead-in line, which may cause the delays and additional adjustments by the pilot and ground crew to make the aircraft and ramp line up despite improper positioning of the aircraft. This can be particularly problematic in multiple taxiway systems, where precision is even more important. These current technologies also both still continue to fall short on the ability to meet the critical requirements of today's airports, which can include: having a long scan range of, for example, more than 150 m; being operationally flexible and adaptable; being auto-calibration able, allowing for detection and tracking of aircraft, vehicles, people, etc.; providing aircraft type and/or sub-type identification; providing accurate and repeatable guidance; improved safety through apron mapping, wing tip clearance, obstacle detection, FOD, etc.; improved surveillance by being an extension to surveillance sensors that cover gate areas; all weather capable; and low maintenance.

BRIEF DESCRIPTION OF THE DRAWINGS

FIG. 7 illustrates a method for detection, tracking, and docking aircraft in a taxiway or ramp area of an airport in accordance with one or more embodiments of the present disclosure.

DETAILED DESCRIPTION

Figure 1:
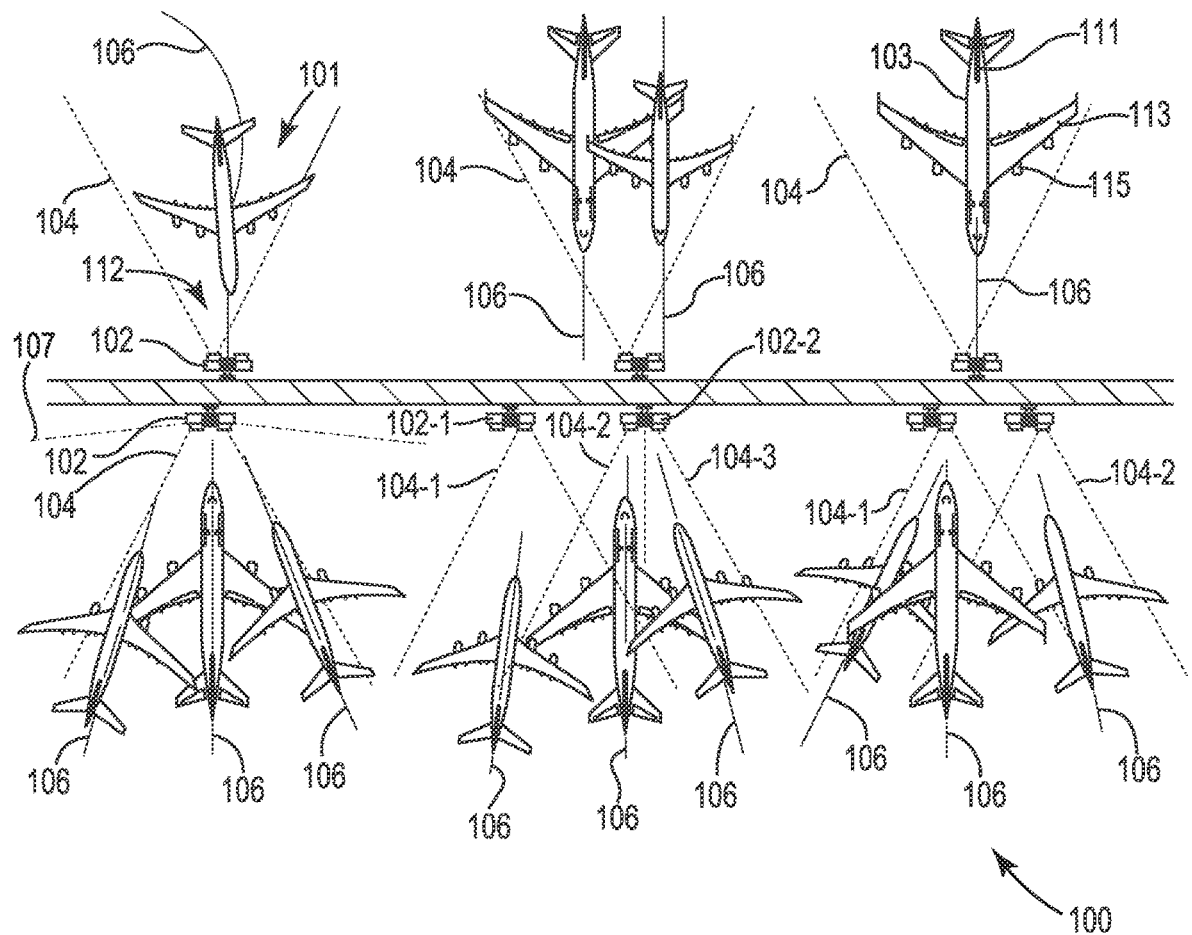
FIG. 1 illustrates a number of aircraft ramp area arrangements that can be used in accordance with one or more embodiments of the present disclosure.

Based on the increased capacity over airspace and passenger throughput, most larger airports are seeing an increasing number of aircraft movements per day. With limited infrastructure, it can be difficult for the airports to manage the increased demand and capacity. The embodiments of the present disclosure overcome the above challenges, by improving ground operations to reduce aircraft turnaround time. The embodiments also can potentially optimize the amount of the time required for the aircraft to be to complete the turnaround process, among other benefits.

Benefits of the concepts proposed herein are important to an airport because of several factors. For example, some factors include: the safety of the aircraft and ground operators during the ramp operations from docking to pushback; early detection of aircraft via the docking system's long range capabilities to meet ripple taxiway lines; precise and/or accurate docking so that there is no significant time taken for connecting a ramp or the need for tow vehicles to adjust the docking; obstacle detection prior to docking; and pre-positioning of the ramp area equipment before the docking to reduce turnaround times. Further, the solutions herein can be beneficial in aircraft detection at all times during the day and night, in all weather conditions, in all lighting conditions, and for all aircraft types and subtypes with all colors, unlike prior systems.

In the following detailed description, reference is made to the accompanying drawings that form a part hereof. The drawings show, by way of illustration, how one or more embodiments of the disclosure may be practiced.

These embodiments are described in sufficient detail to enable those of ordinary skill in the art to practice one or more embodiments of this disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 116 may reference element "16" in FIG. 1, and a similar element may be referenced as 216 in FIG. 2.

As used herein, "a" or "a number of" something can refer to one or more such things. For example, "a number of 3D models" can refer to one or more 3D models. Further, as used herein, the term "docking system" is used by itself to refer to the broad system that controls the docking process. The "docking system" includes a central docking system component and a ramp docking system component that each provide different functions within the overall docking system, as will be discussed in more detail below.

FIG. 1 illustrates a number of aircraft ramp area arrangements that can be used in accordance with one or more embodiments of the present disclosure. In FIG. 1, the three arrangements at the top illustrate a number of embodiments using one sensor array (i.e., a combination of at least one camera image sensor and at least one laser/radar sensor, described herein as a LIDAR/Radar sensor, but embodiments are not so limited) with aircraft 101 located in ramp areas 100. The bottom three arrangements show embodiments having multiple sensor arrays, as will be discussed in more detail below.

Each arrangement has several common elements. For example, all of the arrangements include a ramp area wherein at least a portion of the ramp area is within the field of view 104 of at least one sensor of a sensor array 102. Although described herein as a "ramp area", the ramp area as used herein merely means a parking space for an aircraft located on the airside apron of a gate at an airport and although described herein using the term "ramp", the space may sometimes be in a location where passengers and crew access the aircraft via stairs from the tarmac and a ramp is not used. The embodiments of the present disclosure may be used in such arrangements as well.

Each arrangement also includes at least one aircraft 101 in the ramp area and wherein at least a portion of the aircraft is within the field of view of the image sensor of sensor array 102. In some of the arrangements, a large aircraft arrangement is superimposed over a small aircraft arrangement to show the versatility of these ramp area configurations.

The arrangements also all show at least one lead-in line 106 that indicates to the pilot the correct path to follow to position the aircraft in the correct position and orientation with the ramp area. These lead-in lines can be painted on the tarmac and/or can be virtual lines provided on a display viewed by the pilot on a pilot unit computing device. In arrangements where the ramp area is used with multiple aircraft types, such as the large and small arrangements shown, lead-in lines can be provided for each aircraft and the pilot will need guidance to know which lead-in line to follow based on their type of aircraft.

With respect to the single sensor array embodiments, the embodiment on the top left shows an aircraft 101 moving into a ramp area within the field of view 104 of sensor array 102 having a camera image sensor and a LIDAR/Radar sensor (together represented at 112). Although most of the lead-in paths are indicated as straight into the ramp area, but at different positions within the field of view. The top left arrangement illustrates that the aircraft has altered its path (the curvature shown represents the mid-course adjustment) to align itself with the correct lead-in line. It is the concepts disclosed herein that allow for such precise adjustment during movement of the aircraft.

The arrangements on the bottom provide several multiple sensor embodiments. As can be discerned by the illustration, using multiple sensor arrays 102, can allow for more precise movements and can allow for aircraft docking scenarios the are not straight, such as those shown on the bottom of the illustration (straight arrangements shown on top).

For example, in the bottom left arrangement, two sensor arrays are provided in a single location (e.g., one device with multiple arrays or multiple arrays in close proximity to each other). In this example, the two sensors have a different field of view, with one having a wide field of view (dashed line 107 nearly parallel to the surface of the array) and the other sensor having a narrower field of view 104.

In this manner, the arrays collect different information from their positions that can aid in determining the six dimensional information discussed below and can be helpful in providing data for creating the 3D model discussed herein. The information can be particularly beneficial where the fields of view overlap as those areas then have data from two sources and at different positions, which can be very helpful with respect to 3D modeling and in determining position, orientation, and movement.

The bottom middle arrangement, has two sensor arrays spaced apart from each other. In this embodiment, one sensor array 102-1 has one camera image sensor with a field of view 104-1 and one LIDAR or Radar sensor. The second sensor array 102-2 includes multiple camera image sensors each having a different field of view (104-2 and 104-3). As with the bottom left arrangement, the arrays collect different information from their respective positions that can aid in determining the six dimensional information discussed below and can be helpful in providing data for creating the 3D model discussed herein.

The bottom right arrangement has two arrays spaced apart from each other, but the arrays each have one camera image sensor and one LIDAR/Radar sensor. As can be seen in this arrangement, there are a lot of overlapping fields of view (104-1 and 104-2) between the two arrays. As with the other bottom arrangements, the arrays collect different information from their respective positions that can aid in determining the six dimensional information discussed below and can be helpful in providing data for creating the 3D model discussed herein. It should be noted that the bottom arrangements also allow for a larger field of view area than the top arrangements due to the spacing of the sensors or type of sensors used.

As discussed above, in order to achieve these benefits, the embodiments of the present disclosure include all camera image, laser and radar sensors. For example, the camera sensor capability can provide the detection of the aircraft from the longer distances, such as from the ramp area stand entry lead-in lines and the LIDAR/Radar can provide the clear guidance to the aircraft to perform the precise docking. The data from multiple systems are collected and merged via a data fusion process described herein which provides a rich data set to track and provide guidance to the aircraft, from entry into the ramp area to docking.

As shown in FIG. 1, areas of the aircraft such as the fuselage 103, the tail 111, the wings 113, and the engines 115 can be in the field of view of the camera image sensor 104 (e.g., illustrated in the top right arrangement). As discussed below, characteristics of these aircraft features and characteristics of other features can be used to identify the aircraft's type and/or subtype using the processes discussed herein.

Figure 2:
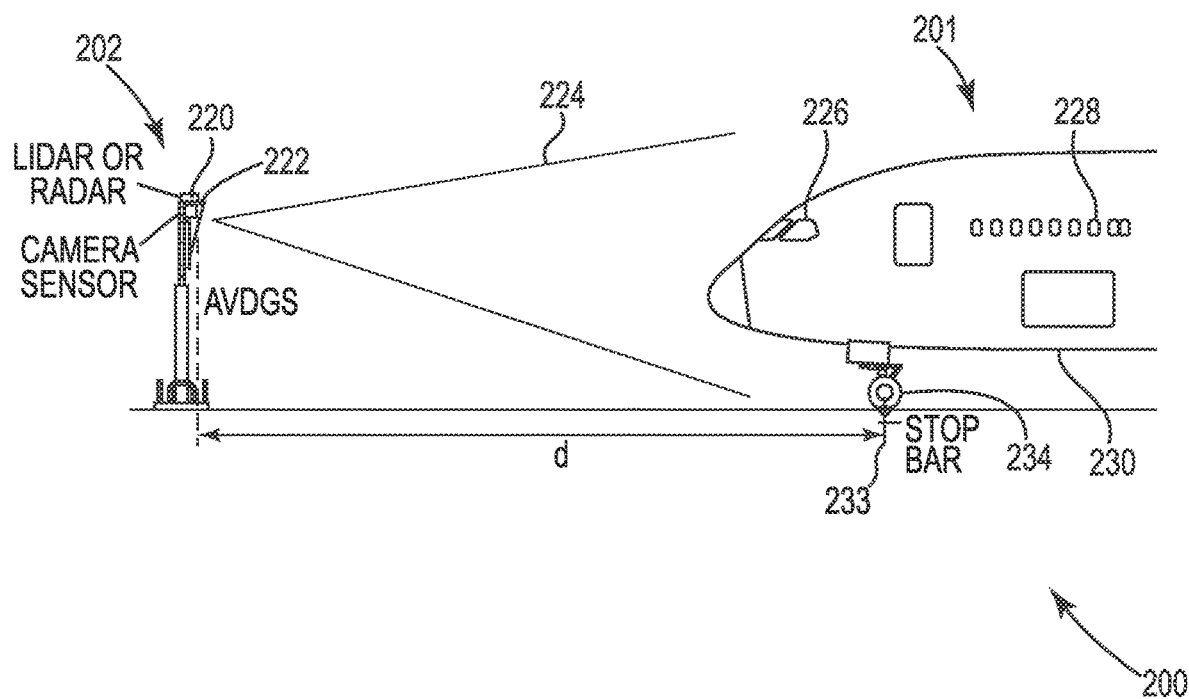
FIG. 2 illustrates an imaging and LIDAR/Radar sensing arrangement in accordance with one or more embodiments of the present disclosure.

FIG. 2 illustrates an imaging and LIDAR/Radar sensing arrangement in accordance with one or more embodiments of the present disclosure. FIG. 2 provides a closer, side perspective of a ramp area within an airport 200 according to an embodiment of the present disclosure. In the embodiment, the camera image sensor 222 and LIDAR/Radar sensor 220 form sensor array 202. This view also illustrates that the field of view 224 has a vertical spread in addition to the horizontal spread generally illustrated in FIG. 1 with respect to the field of view 104.

This data is helpful in creating the 3D model of the aircraft which is used to identify the type and/or subtype of the aircraft, among other uses. Also, as shown in FIG. 2, characteristics of the aircraft 201, such as shape of the fuselage 230, number, shape, and position of passenger windows 228 and pilot windows 226 can be ascertained from the data captured by the camera image sensor 222 depending on the angle of approach of the aircraft to the sensor 222.

Further, the data captured can also indicate positioning of the wheel 234 to the stop point 233 (at stop bar in FIG. 2).

Additionally, the LIDAR/Radar sensor can gauge the distance d to the aircraft to determine whether the aircraft is nearing the stop point 233.

Figure 3:
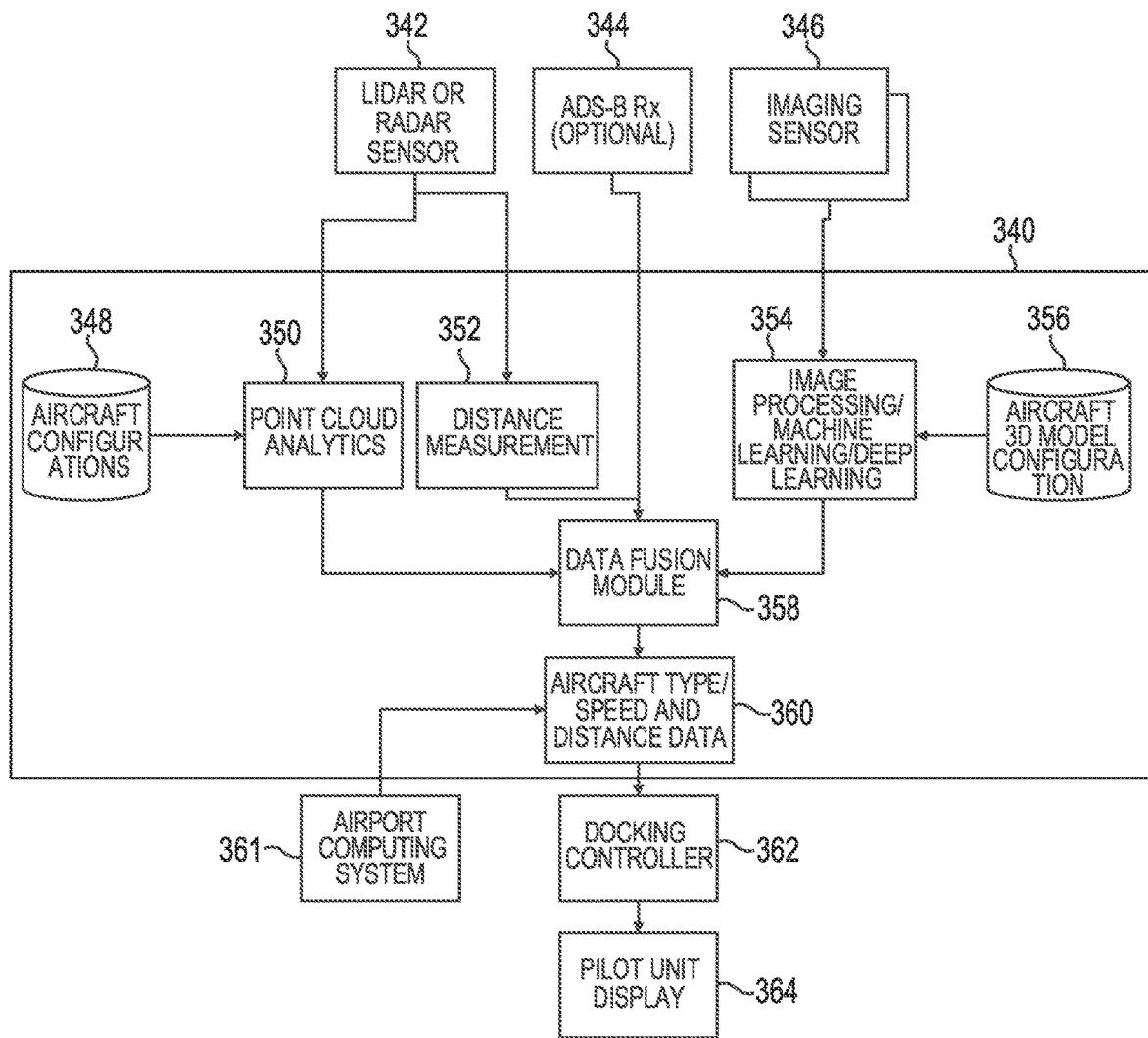
FIG. 3 illustrates a flow diagram of a system showing some components of the system and some functions of the system in accordance with one or more embodiments of the present disclosure.

FIG. 3 illustrates a flow diagram of a system showing some components of the system and some functions of the system in accordance with one or more embodiments of the present disclosure. FIG. 3 shows a central docking system controller 340 of the docking system connected to a number of other devices and systems from which the central docking system controller 340 receives data and/or sends data.

For instance, components including the LIDAR/Radar sensor 342, the ADS-B system 344, the imaging sensor 346, and the airport computing system 361 are examples of components that send data to the central docking system controller 340. The ramp docking system controller 362 and pilot unit display 364 are examples of components that receive information from the central docking system controller 340.

As discussed herein, a LIDAR/Radar system includes computing device executable instructions and data to operate the LIDAR/Radar sensor 342, capture LIDAR/Radar sensor data, and send the data to the central docking system controller 340 for processing. These functions can be carried out in one or more devices and some of these functions may be provided by the central docking system controller 340.

The LIDAR/Radar system provides its data as a plurality of LIDAR/Radar data points, referred to herein as a LIDAR/Radar point cloud (illustrated at 468 of FIG. 4), that are collected as the LIDAR/Radar scans over surfaces of the aircraft. The LIDAR/Radar data can also include distance information 352, indicating, for example, the distance of the front surface of the fuselage of the aircraft to the LIDAR/Radar sensor.

Although LIDAR/Radar sensing is discussed primarily herein, it should be noted that other light/radio based detection and ranging methodologies may be used to provide the functions of the LIDAR/Radar system described herein. Suitable LIDAR/Radar sensing methodologies include those that scan the aircraft with a LIDAR/Radar sensor by sweeping the laser/radio signals across the aircraft in at least one of a horizontal or vertical direction or both. One suitable laser sensing system is a light detection and ranging (LIDAR) system and a suitable radio signal scanning system is Radio Detection and Ranging (RADAR).

As discussed herein, a camera image system includes computing device executable instructions and data to operate the camera image sensor 346, capture image sensor data, and send the data to the central docking system controller 340 for processing. These functions can also be carried out in one or more devices and some of these functions may be provided by the central docking system controller 340. The camera image system provides its data as image data captured from the imaging sensor and can be data representing frames of video data or one or more still images, for example, taken in a sequence.

In embodiments of the present disclosure, an image processing system is used to create an initial aircraft 3D model (these functions are shown at 354 and 356 of FIG. 3) and LIDAR/Radar point cloud analytics (these functions are shown at 348 and 350 of FIG. 3), utilized by a LIDAR/Radar module (shown at 671 of FIG. 6), provide the point cloud for the aircraft that is nearing the ramp area. In some embodiments, the embodiment includes machine learning/deep learning capabilities wherein both of the data outputs get fused by the data fusion module to derive the hybrid accurate aircraft model and/or type and/or subtype detection.

In some embodiments, the LIDAR/Radar point cloud creation, image processing 3D model creation, and data fusion can be real-time processes, depending on the computing and networking speed of the docking system, which derives the speed and position of the aircraft. This will provide the input to the central docking system controller to provide the clear information to use in pilot unit display messages that can be used to provide directional and/or speed guidance to the pilot.

The docking systems of the present disclosure aircraft detection methodology analyze not only the outline shape of a 3D model of an aircraft composed from camera image data, but characteristic shape feature parameters of an aircraft including, for example: the number, position, and/or shape of pilot and/or passenger windows; engine location; engine cover size; number of engines; wing span; wing edge to nose end distance; wing shape; fuselage size and/or shape; tail size and/or shape; tail tip height; nose dimensions; and/or other features. The docking system will also collect data for some similar parameters from the LIDAR/Radar system. Then, based on the data from both data sets, the docking system will determine the position and orientation of the aircraft, its speed, and/or its distance to a stop point where the aircraft is the correct distance from the gate in the ramp area.

Several embodiments are discussed herein. For example, one method embodiment includes receiving camera image data of an aircraft while the aircraft is approaching or in the ramp area, receiving LIDAR/Radar sensor data of an aircraft while the aircraft is approaching or in the ramp area, merging the camera image data and the LIDAR/Radar sensor data into a merged data set, and wherein the merged data set includes at least one of: data for determining the position of the aircraft relative to the position of the ramp area, data for determining the orientation of the aircraft relative to the orientation of the ramp area, data for determining speed of the aircraft, data for determining direction of the aircraft, data for determining proximity of the aircraft to a particular object within the ramp area, and data for forming a three dimensional virtual model of at least a portion of the aircraft from the merged data.

In some embodiments, in order to identify a probable aircraft type, the docking system can use LIDAR/Radar data and machine learning and image data (at 354 of FIG. 3) to determine aircraft 3D model, then merging the data together using data fusion module 358. This merged data can be used to provide a determination of aircraft type and determination of speed and distance 360. For example, the docking system can compare a three dimensional virtual model to one or more aircraft reference models stored in memory of a computing device to find a match between the three dimensional virtual model and one of the aircraft reference models to determine an aircraft type.

In some embodiments, the docking system does not need to find an exact match to a reference model, but can use a statistical probability algorithm to consider how closely the approaching aircraft matches a reference aircraft based on the data's closeness to matching a characteristic of an aircraft (e.g., pilot window position, shape, orientation, nose shape, tail tip height, etc.). As discussed herein, the docking system can receive aircraft type data from the airport's computing system. The docking system can then compare the determined aircraft type with an aircraft type provided in gate arrival information (e.g. from the airport computing system) to determine that the aircraft type that is approaching or in the ramp area is the correct aircraft type.

If the docking system confirms that the correct type of aircraft is entering the ramp area, the docking system can forward guidance information to be displayed by a pilot unit computing system 364 on the aircraft and ramp docking system controller 362 to assist the pilot in positioning and orienting the aircraft correctly with respect to the ramp area and any objects in the ramp area.

If the aircraft is going to the wrong ramp area, the docking system can send information to the pilot indicating that they are going to wrong ramp area. In some embodiments, the docking system can instruct the pilot to stop talking so that they can receive important information.

Through use of this data, embodiments of the present disclosure can, for example, provide ramp area object detection and the presence of foreign objects in the ramp area. For example, the docking system can locate objects in the ramp area and monitor proximity of the aircraft to a particular object within the ramp area including using data for determining proximity of the aircraft to a piece of equipment on a ramp area tarmac surface or near a stop point. Further, some embodiments can be utilized with several ramp area layouts including: single funnel w/single lead-inline, multiple lead-in lines with single funnel where the lead-in lines are converging, and two funnels jointly connected, as illustrated in FIG. 1, and these areas can be monitored for aircraft and objects as discussed herein.

Embodiments can also identify a region of interest of a ramp area. For example, an area of interest can be the area that the aircraft will occupy when positioned correctly or a path through the ramp area through which the aircraft will traverse to arrive at the stop point. This can be helpful to identify objects that will need to be moved before or as the aircraft approaches the ramp area.

The docking system can also validate the 3D model based on comparisons with the other models stored and already identified as certain aircraft models to identify which type of aircraft is coming into the ramp area and compare that information with aircraft arrival information to ensure the correct type of aircraft is coming into the ramp area. In some embodiments, the 3D model database and the comparison functionality can be expanded and precisioned based on the use of machine learning. With more models and a higher success rate of positive identifications, the docking system can more accurately identify that the approaching aircraft is of the correct aircraft type and may be able to make the identification more quickly, allowing for an incorrect aircraft to be notified and guided to change course before it enters the ramp area.

One suitable camera system includes: at least one sensor (e.g. single camera or dual camera sensor models), an image processor, and memory. The docking system collects data from one or more frames of image data captured by the image sensor. One suitable system collects image data at, for example, 30 frames per second. As discussed herein, this image data can be used to create a 3D model of the aircraft.

The camera can, for example, include mono or multimode sensors, such as high definition camera sensors that can capture the field of view of the apron, including most or all of the ramp area and, potentially, some area outside the ramp area where an aircraft will taxi through to get to the ramp area.

To accomplish this, the camera can, for example, use a camera based pose detection algorithm that uses 3D models of aircraft and image contours to estimate six dimensions (6D) of pose (i.e., x, y, z, roll, pitch, and yaw) of the aircraft to perform a vision pose estimation process.

This 6D of pose estimation can be accomplished by, for example, orienting the projection of the 3D model within an image plane by using a calibrated camera (wherein the image plane is defined as part of the calibration process and wherein the image plane is associated with a real world plane of the ramp area) and then comparing the projection with image contours of the aircraft (from the camera image data). From this data, the six dimensions of the aircraft in the image can be determined.

Additionally, once the camera image data and data have been collected, a data fusion process can occur, where qualities of each data set can be used together to identify the 6D elements. One process for accomplishing data fusion can be to: receive data to be used to form a 3D point cloud from the sensor, calculate a transformation between the coordinates of the system and a vision coordinate system of the camera image system (representative of a real world coordination system of the ramp area), determine an estimated pose of the 3D model from the vision pose estimation process described above. This transformation can be accomplished, for example, by having the sensor data analyzed using a point cloud process to correlate points in the sensor data to points in the camera image data.

This pose can also be determined from any other sensor type, such as from an automatic dependent service-broadcast (ADS-B). An ADS-B system is an in air communications system that broadcasts position, velocity, and other parameters and can be used with embodiments herein to improve aircraft tracking, especially just prior to and entering the camera field of view.

The process also can include: registering point cloud data generated out of the 3D model and 3D point cloud data from the sensor, through an iterated point cloud algorithm (ICP). This registration between the two point cloud data sets can create a final improved pose which is the fusion of both point clouds. As used herein, the process of point cloud analytics refers to registering the points on the point cloud, formed from the image sensor data, to positionally similar data points received from the sensor. This can be accomplished, for example, by mapping both data sets to a virtual space having a common coordinate system.

This improved pose can, for example, be used to find the kinematics of the approaching aircraft using an estimation algorithm (e.g., velocity, acceleration, etc.). The improved pose from the fusion process and the 3D model can also be used to mask out an area occupied by aircraft (e.g., define an aircraft shaped space). In some embodiments, using this mask process, the docking system can search for potential obstacles in the masked area and find places to move them that are located in the non-masked part of the ramp area, using the camera image data. Simply stated, to accomplish this, the docking system identifies objects that are not the aircraft and spaces that are not the masked area.

The docking system can also utilize airport gate information in its analysis. For example, once an airport gate has been assigned by the airport computing system, that information is forwarded to the central docking system. This data includes gate arrival information such as, for example, an aircraft type scheduled to arrive at the gate.

As discussed herein, the docking system can receive information about an incoming flight from the airport computing system 361. For example, the data received from the airport computing system can include an aircraft type—832N, among other information relevant to docking. For example, a database in the airport computing system can communicate with a central aircraft docking control system at the airport and to the docking system at the particular ramp area where the aircraft is attempting to dock. The central docking system has a set of aircraft templates stored in memory. The central docking system uses the 832N aircraft type to identify which template represents the type of aircraft arriving at the ramp area and provides that information to the docking system at the ramp area.

In some embodiments, the docking system will search the area it can sense for that aircraft type until it comes into the area. Once an aircraft is sensed, the docking system then checks to see if it is the correct type of aircraft. In some embodiments, camera image data and LIDAR/Radar sensor data can be compared to identify whether an aircraft is present in both the camera image data and the LIDAR/Radar sensor data. This can, for example, be done before merging the camera image data and the LIDAR/Radar sensor data. In this way, computing resources won't be wasted on analysis of objects that are not aircraft.

A suitable guidance range for such systems is that the LIDAR/Radar sensing range of the docking system should allow for sensing to at least the last 25 meters from the stop point. The guidance module of the central docking system can, for example, provide the remaining distance and the horizontal deviation with respect to the center line of the path (e.g., lead-in line) that the aircraft is supposed to follow. This can provide the pilot with directions regarding how to get the aircraft to the correct location. In some embodiments, the guidance system can indicate to the pilot when to brake in order to stop on the stop point.

The docking system can also provide and monitor maximum speeds for approaching a gate. These speed thresholds can be set and monitored and instructions can be passed to the pilot to slow down. For example, in some embodiments, the determined speed, position, orientation, and/or direction can be sent to a ramp docking system controller device in the ramp docking system and then passed to the pilot unit computing device. After docking at the stop point, the use of chocks can be identified and communicated to the pilot via the central docking system controller, so the pilot knows that they should not try to move the aircraft.

In some embodiments, this information can also be sent to a passenger computing device on the aircraft, so passengers can see when they arrive in the ramp area. This may be beneficial at larger airports where the aircraft may taxi for a long period.

In addition to providing a very robust data set and offering significant additional analysis functionalities, embodiments of the present disclosure also provide redundancy if either the LIDAR/Radar or imaging system are not functioning. This can be highly beneficial in allowing the airport gate to continue to function even if one of the two systems is not operating.

Figure 4:
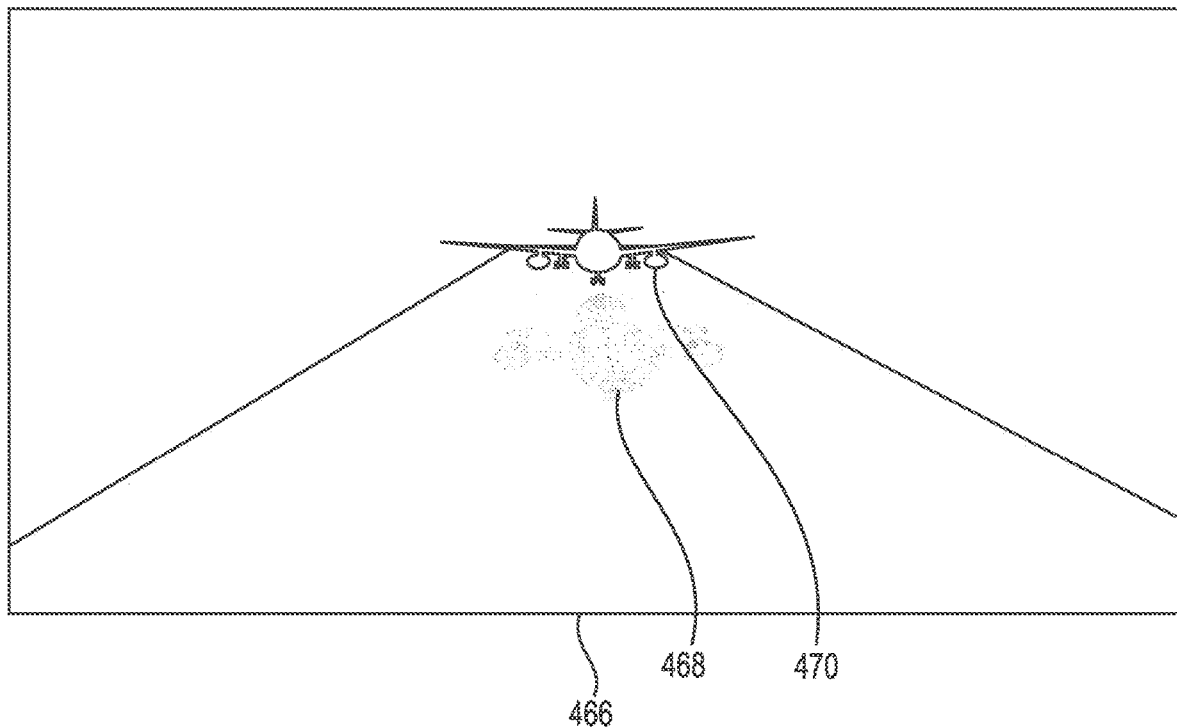
FIG. 4 illustrates a two dimensional display of a three dimensional (3D) model of an aircraft and sample point cloud data set in accordance with one or more embodiments of the present disclosure.

FIG. 4 illustrates a two dimensional display of a three dimensional (3D) model of an aircraft and sample point cloud data set in accordance with one or more embodiments of the present disclosure. FIG. 4 illustrates the differences between the point cloud data 468 and the 3D model data 470 as illustrated in a virtual 3D space. As can be understood from this comparison, the two data sets are very distinctly different and each has its beneficial uses, as discussed herein.

Figure 5:
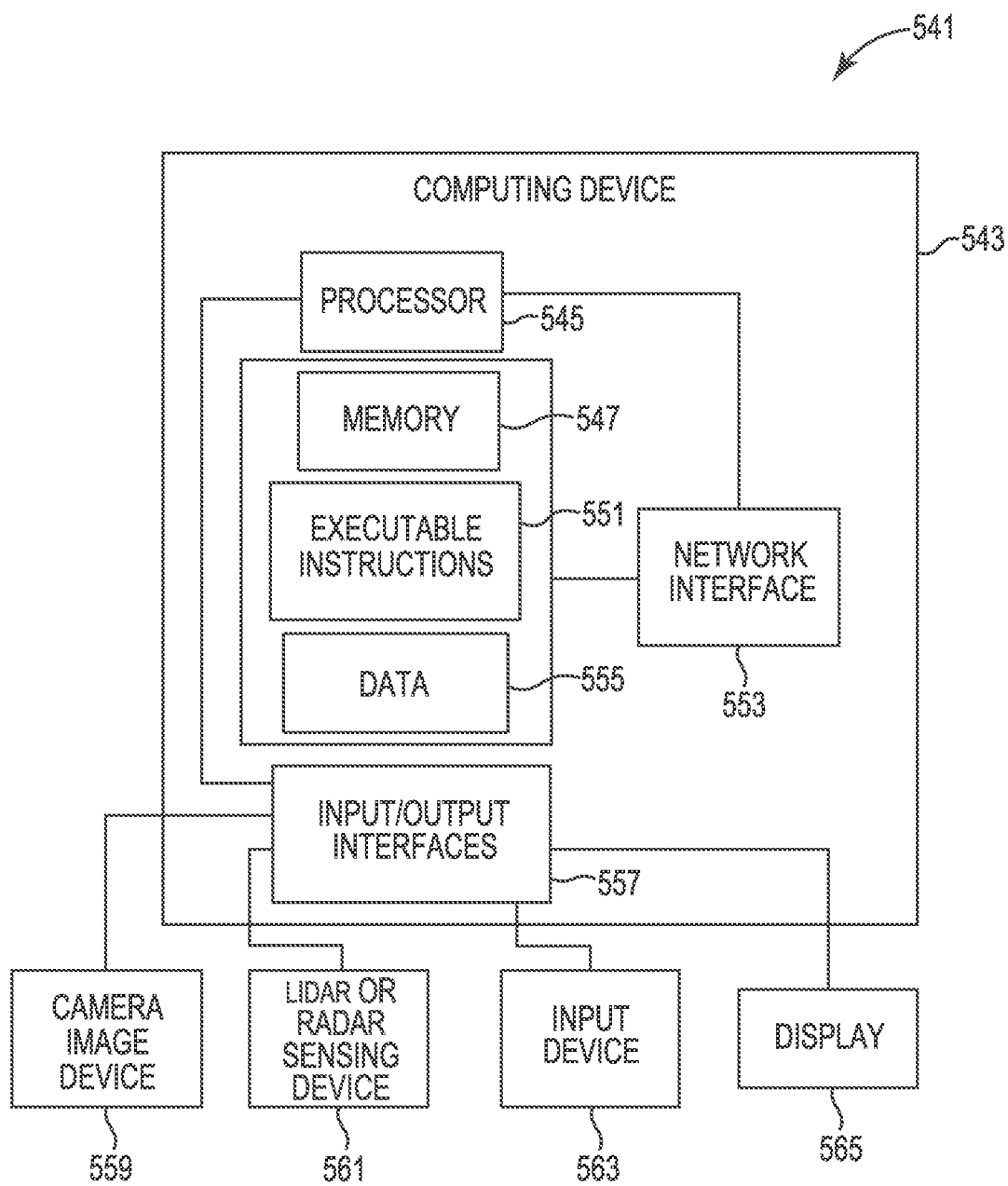
FIG. 5 illustrates a computing device for use in accomplishing ramp area aircraft movement functions in accordance with one or more embodiments of the present disclosure.

FIG. 5 illustrates a computing device for use in accomplishing ramp area aircraft movement functions in accordance with one or more embodiments of the present disclosure. Computing device 543 is a typical computing device that can be used as the airport computing system, as the central docking system controller 340, as the ramp docking system controller 362, and/or as the pilot unit 364, as described in FIG. 3. In the system illustrated in FIG. 5, the system 541 includes a computing device 543 having a number of components coupled thereto. The computing device 543 includes a processor 545 and memory 547. The memory 547 can include various types of information including data 555 and instructions 551 executable by the processor 545, discussed herein.

Memory and/or the processor may be located on the computing device 543 or off the device, in some embodiments. The system can include a network interface 553. Such an interface can allow for processing on another locally networked computing or other device or devices on other networks. For example, the network interface can include a computing device having Internet access for allowing access to the airport computing system or to access other computing resources to access flight information.

As illustrated in the embodiment of FIG. 5, a system can include one or more input and/or output interfaces 557. Such interfaces can be used to connect the computing device with one or more input or output devices. These devices can be used to receive or access data that can be used to accomplish the functions described herein.

For example, in the embodiment illustrated in FIG. 5, the system 541 can include connectivity to a camera image device 559 (sensing device), a LIDAR/Radar sensing device 561, an input device 563 (e.g., a keyboard, mouse, touch screen, etc.), a display device 565 (e.g., a monitor) and/or one or more other input devices. The input/output interface 557 can receive data, storable in the data storage device (e.g., memory 547), for example, representing the sensor data or aircraft type information discussed herein, among other information.

The processor 545 can be configured to execute instructions stored in memory to execute functions of the docking system and/or provide the functionalities described herein, and can provide those details to a display 565 (e.g., on a graphical user interface (GUI) running on the processor 545 and visible on the display 545).

Such connectivity can allow for the input and/or output of data and/or instructions among other types of information. Although some embodiments may be distributed among various computing devices within one or more networks, such systems as illustrated in FIG. 5 can be beneficial in allowing for the query, analysis, and/or display of information discussed herein.

Figure 6:
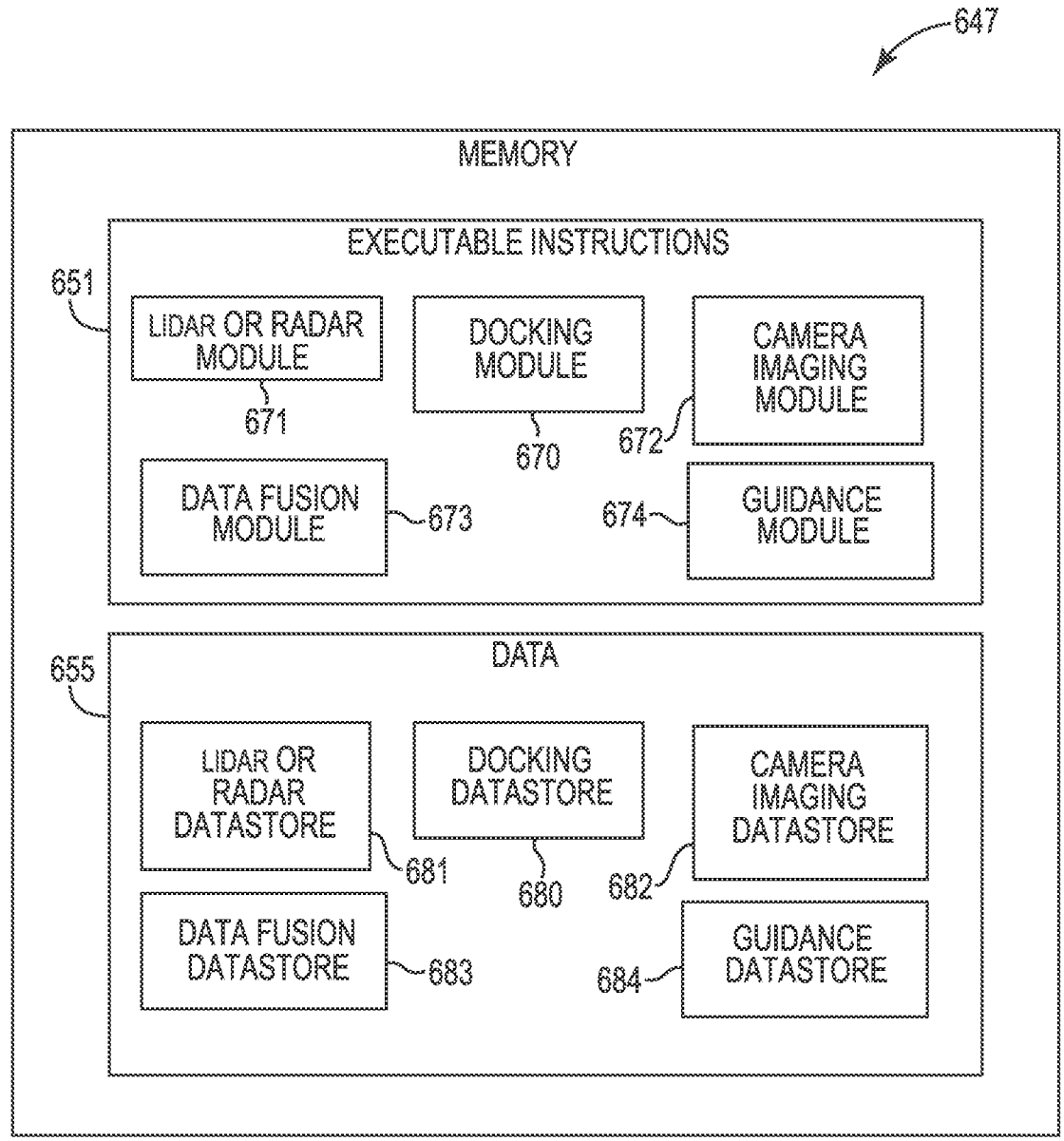
FIG. 6 illustrates a memory location in a computing device of a docking system in accordance with one or more embodiments of the present disclosure.

FIG. 6 illustrates a memory location in a computing device of a docking system in accordance with one or more embodiments of the present disclosure. Memory 647 includes executable instructions 651 that can be grouped into modules based on the functionality the grouped instructions provide. The main functionality modules used by the docking system are: a docking module 670, a LIDAR/Radar module 671, a camera image module 672, a data fusion module 673, and a guidance module 674.

Data 655 is also stored in memory that is used with each of the executable instruction modules to accomplish that module's specific functions. Accordingly, memory includes a docking datastore 680, a LIDAR/Radar datastore 681, a camera image datastore 682, a data fusion datastore 683, and a guidance datastore 684. This data can include items such as sensor data, aircraft type data, data for configuring 3D virtual spaces to be presented on a display, a library of models of aircraft already identified, and other such data useful to accomplish the functions discussed herein.

FIG. 7 illustrates a method for detection, tracking, and docking aircraft in a taxiway or ramp area of an airport in accordance with one or more embodiments of the present disclosure. In the method of FIG. 7, the method recites: receiving camera image data of an aircraft while the aircraft is approaching or in the ramp area, at block 790. The method also includes: receiving LIDAR/Radar sensor data of an aircraft while the aircraft is approaching or in the ramp area, at block 792.

At block 794, the method merges the camera image data and the LIDAR/Radar sensor data into a merged data set. The merged data set includes, at block 796, at least one of: data for determining the position and orientation of the aircraft relative to the position and orientation of the ramp area, data for determining speed of the aircraft, data for determining direction of the aircraft, data for determining proximity of the aircraft to a particular object within the ramp area, and data for forming a three dimensional virtual model of at least a portion of the aircraft from the merged data. Such a method can provide a robust, merged data set that can provide many benefits over prior systems, as discussed herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for tracking an aircraft, comprising:
a sensor array, positioned at or near a ramp area at an airport, having a camera image sensor device and a light detection and ranging (LIDAR) sensor device that are both located at a single sensor array location with respect to the ramp area;
the camera image sensor device configured to capture camera image data illustrating the aircraft while the aircraft is approaching or in the ramp area;
a computing device at or near the ramp area of the airport having memory and a processor associated therewith configured to receive the camera image data from the camera image sensor device;
the LIDAR sensor device configured to capture LIDAR sensor device data illustrating the aircraft while the aircraft is approaching or in the ramp area; and the computing device having the memory and the processor associated therewith configured to receive the LIDAR sensor device data, the computing device configured to:
   use a combination of the camera image data and the LIDAR sensor device data associated with the aircraft to determine a position of the aircraft approaching or in the ramp area; and
   cause a display of messages to provide directional and speed guidance with respect to a center line and a parking location to a pilot based, at least in part, on the position of the aircraft.

2. The system of claim 1, wherein the computing device is configured to receive the LIDAR sensor device data and merge the camera image data and the LIDAR sensor device data associated with the aircraft into a merged data set to create the combination of the camera image data and the LIDAR sensor device data.

3. The system of claim 2, wherein the merged data set is used to form a three dimensional virtual model illustrating at least a portion of the aircraft to determine the position of the aircraft approaching or in the ramp area.

4. The system of claim 1, wherein the camera image data is used to determine an image vision pose estimate including an image plane that is used to orient a three dimensional virtual model of the aircraft with respect to a virtual ramp area.

5. The system of claim 1, wherein the camera image sensor device is configured to provide data for multiple image frames taken at different times and each image frame is used to determine a plurality of positions of the aircraft at different times.

6. The system of claim 5, wherein the determined plurality of positions at different times are compared to estimate a speed of the aircraft, and
   wherein the computing device is configured to cause the display of the messages based, also at least in part, on the estimated speed of the aircraft.

7. The system of claim 5, wherein the determined plurality of positions at different times are compared to estimate a direction of the aircraft, and
   wherein the computing device is configured to cause the display of the messages based, also at least in part, on the estimated direction of the aircraft.

8. A method for tracking an aircraft, comprising:
   providing a sensor array, positioned at or near a ramp area at an airport, having a camera image sensor device and a light detection and ranging (LIDAR) sensor device that are both located at a single sensor array location with respect to the ramp area;
   capturing camera image data illustrating an aircraft while the aircraft is in a field of view of the camera image sensor device while the aircraft is approaching or in the ramp area;
   capturing LIDAR sensor device data illustrating the aircraft while the aircraft is in a field of view of the LIDAR sensor device while the aircraft is approaching or in the ramp area;
   using a combination of the camera image data and the LIDAR sensor device data illustrating the aircraft to determine a position of the aircraft approaching or in the ramp area; and
   displaying messages to provide directional and speed guidance with respect to a center line and a parking location to a pilot based, at least in part, on the position of the aircraft.

9. The method of claim 8, wherein the method comprises merging the camera image data and the LIDAR sensor device data illustrating the aircraft into a merged data set to create the combination of the camera image data and the LIDAR sensor device data.

10. The method of claim 9, wherein the method comprises forming a three dimensional virtual model using the merged data set, wherein the three dimensional virtual model illustrates at least a portion of the aircraft to determine the position of the aircraft approaching or in the ramp area.

11. The method of claim 8, wherein the method comprises determining an image vision pose estimate including an image plane that is used to orient a three dimensional virtual model of the aircraft with respect to a virtual ramp area using the camera image data.

* * * * *